(12) United States Patent
Takao

(10) Patent No.: US 11,735,078 B2
(45) Date of Patent: Aug. 22, 2023

(54) CONTROL DEVICE, CONTROL METHOD, CONTROL PROGRAM, AND CONTROL SYSTEM

(71) Applicant: SONY GROUP CORPORATION, Tokyo (JP)

(72) Inventor: Yoshiyuki Takao, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 65 days.

(21) Appl. No.: 17/604,862

(22) PCT Filed: May 25, 2020

(86) PCT No.: PCT/JP2020/020602
§ 371 (c)(1),
(2) Date: Oct. 19, 2021

(87) PCT Pub. No.: WO2020/246296
PCT Pub. Date: Dec. 10, 2020

(65) Prior Publication Data
US 2022/0262284 A1 Aug. 18, 2022

(30) Foreign Application Priority Data
Jun. 6, 2019 (JP) ................................. 2019-106298

(51) Int. Cl.
*G09G 3/00* (2006.01)
*G06F 3/01* (2006.01)
(Continued)

(52) U.S. Cl.
CPC ............. *G09G 3/001* (2013.01); *G06F 3/013* (2013.01); *G09G 5/006* (2013.01); *G09G 5/10* (2013.01); *H04N 9/3185* (2013.01)

(58) Field of Classification Search
CPC .......... G09G 3/001; G09G 5/006; G09G 5/10; G09G 3/03; G09G 2300/026;
(Continued)

(56) References Cited

U.S. PATENT DOCUMENTS

2002/0024640 A1* 2/2002 Ioka ...................... G03B 21/13
348/E9.027
2004/0233125 A1* 11/2004 Tanghe ................. G06F 3/1446
345/1.3
(Continued)

FOREIGN PATENT DOCUMENTS

JP H04-063092 A 2/1992
JP 2004-191487 A 7/2004
(Continued)

*Primary Examiner* — Antonio Xavier
(74) *Attorney, Agent, or Firm* — Paratus Law Group, PLLC

(57) ABSTRACT

There is provided a control device, a control method, a control program, and a control system that are capable of presenting a VR experience with a high sense of immersion using a tiling display. The control device acquires arrangement of displays in a tiling display in which a plurality of displays is tiled, acquires a light-emitting characteristic of each of the displays, tracks a position and a line-of-sight direction of a user with respect to the tiling display, and adjusts a luminance value of each of the displays on the basis of the light-emitting characteristic and a tracking result by the tracking such that brightness of the displays viewed from the user becomes continuous through a boundary of the displays.

7 Claims, 12 Drawing Sheets

(51) Int. Cl.
*G09G 5/00* (2006.01)
*G09G 5/10* (2006.01)
*H04N 9/31* (2006.01)

(58) Field of Classification Search
CPC ..... G09G 2320/0233; G09G 2320/043; G09G 2320/0626; G09G 2354/00; G09G 3/32; G06F 3/013; G06F 3/011; H04N 9/3185; H04N 9/3194; G09F 9/33; G09F 9/40
See application file for complete search history.

(56) References Cited

U.S. PATENT DOCUMENTS

| | | | | |
|---|---|---|---|---|
| 2009/0244267 | A1* | 10/2009 | Yuan | G06T 15/20 348/51 |
| 2011/0273369 | A1* | 11/2011 | Imai | G06T 15/50 345/158 |
| 2012/0182278 | A1* | 7/2012 | Ballestad | G01J 1/4204 345/207 |
| 2012/0326946 | A1 | 12/2012 | Yuan et al. | |
| 2013/0181901 | A1* | 7/2013 | West | H04N 9/3147 345/1.3 |
| 2016/0155389 | A1* | 6/2016 | Beon | G09G 3/3406 345/690 |
| 2016/0358582 | A1* | 12/2016 | Lee | G06F 3/1446 |
| 2017/0070711 | A1* | 3/2017 | Grundhofer | H04N 9/3185 |
| 2017/0324944 | A1* | 11/2017 | Nakajima | H04N 13/363 |
| 2020/0045275 | A1* | 2/2020 | Hsiao | G06T 3/0037 |
| 2020/0090560 | A1* | 3/2020 | Dewaele | G06F 3/1446 |

FOREIGN PATENT DOCUMENTS

| | | |
|---|---|---|
| JP | 2005-115069 A | 4/2005 |
| JP | 2007-180979 A | 7/2007 |
| JP | 2016-116162 A | 6/2016 |
| JP | 2016-142865 A | 8/2016 |
| JP | 2019-146155 A | 8/2019 |

\* cited by examiner

CONTROL DEVICE, CONTROL METHOD, CONTROL PROGRAM, AND CONTROL SYSTEM

CROSS REFERENCE TO PRIOR APPLICATION

This application is a National Stage Patent Application of PCT International Patent Application No. PCT/JP2020/020602 (filed on May 25, 2020) under 35 U.S.C. § 371, which claims priority to Japanese Patent Application No. 2019-106298 (filed on Jun. 6, 2019), which are all hereby incorporated by reference in their entirety.

TECHNICAL FIELD

The present technology relates to a control device, a control method, a control program, and a control system relating to video display using a tiling display.

BACKGROUND ART

The tiling display is a stack of a plurality of displays and is a display capable of large-screen or wide-range display. Although the tiling display has conventionally existed as a large-screen display device, it has been conventionally difficult to display high resolution images in which the pixel value is large and by which the sense of immersion is evoked. On the other hand, a device capable of displaying in high resolution by using micro light emitting diodes (LEDs) or the like as pixels has also been developed in recent years (see, for example, Patent Literature 1).

Virtual reality (VR) display environments can be formed by disposing the tiling display so as to surround a space. On the other hand, it is not easy to fabricate a curved display, and a plurality of planar displays is arranged such that the display surface forms a predetermined angle with the adjacent display, so that the VR display environment is formed.

CITATION LIST

Patent Literature

Patent Literature 1: Japanese Patent Application Laid-open No. 2004-191487

DISCLOSURE OF INVENTION

Technical Problem

However, if the display surface is disposed at a predetermined angle, joints of the displays are visually recognized even in the display including no frame in the display periphery, and there is a problem that the sense of immersion is inhibited.

In view of the circumstances as described above, it is an object of the present technology to provide a control device, a control method, a control program, and a control system that are capable of presenting a VR experience with a high sense of immersion using a tiling display.

Solution to Problem

In order to achieve the above object, a control device according to the present technology acquires arrangement of displays in a tiling display in which a plurality of displays is tiled, acquires a light-emitting characteristic of each of the displays, tracks a position and a line-of-sight direction of a user with respect to the tiling display, and adjusts a luminance value of each of the displays on the basis of the light-emitting characteristic and a tracking result by the tracking such that brightness of the displays viewed from the user becomes continuous through a boundary of the displays.

In the step of adjusting the luminance value, a visual field range visually recognized by the user in the tiling display may be specified on the basis of the line-of-sight direction, an amount of light incident on an eye of the user from each position in the visual field range may be estimated, and the luminance value of each of the displays may be adjusted such that the amount of light incident on the eye of the user from each position becomes continuous.

Each of the displays may be a light emitting diode (LED) display including LED elements as pixels, and in the step of adjusting the luminance value, the amount of light incident on the eye of the user from each of the LED elements in the visual field range may be estimated, and the LED elements may be controlled such that the amount of light incident on the eye of the user from each of the LED elements becomes continuous.

The control device may further acquire a reflection characteristic of each of the displays, and in the step of adjusting the luminance value, the amount of light incident on the eye of the user from each position may be a sum of an amount of light directly incident on the eye of the user from each position and an amount of light incident on each of the displays from each position, reflected by each of the displays, and incident on the eye of the user.

The control device may further perform geometric correction on a video displayed on the displays on the basis of the arrangement of the displays and the tracking result by the tracking.

In the step of acquiring arrangement of displays, a predetermined pattern may be projected on the tiling display, and the arrangement of the displays may be measured on the basis of a deformation of the pattern.

In order to achieve the above object, a control program according to the present technology acquires arrangement of displays in a tiling display in which a plurality of displays is tiled, acquires a light-emitting characteristic of each of the displays, tracks a position and a line-of-sight direction of a user with respect to the tiling display, and adjusts a luminance value of each of the displays on the basis of the light-emitting characteristic and a tracking result by the tracking such that brightness of the displays viewed from the user becomes continuous through a boundary of the displays.

In order to achieve the above object, a control method according to the present technology includes: acquiring arrangement of displays in a tiling display in which a plurality of displays is tiled; acquiring a light-emitting characteristic of each of the displays; tracking a position and a line-of-sight direction of a user with respect to the tiling display; and adjusting a luminance value of each of the displays on the basis of the light-emitting characteristic and a tracking result by the tracking such that brightness of the displays viewed from the user becomes continuous through a boundary of the displays.

In order to achieve the above object, a control system according to the present technology includes a tiling display and a control device.

In the tiling display, a plurality of displays is tiled such that at least some of the displays are non-parallel to an adjacent display.

The control device acquires arrangement of the displays in the tiling display, acquires a light-emitting characteristic of each of the displays, tracks a position and a line-of-sight direction of a user with respect to the tiling display, and adjusts a luminance value of each of the displays on the basis of the light-emitting characteristic and a tracking result by the tracking such that brightness of the displays viewed from the user becomes continuous through a boundary of the displays.

MODE(S) FOR CARRYING OUT THE INVENTION

A control system according to an embodiment of the present technology will be described.

[Configuration of Control System]

Figure 1:
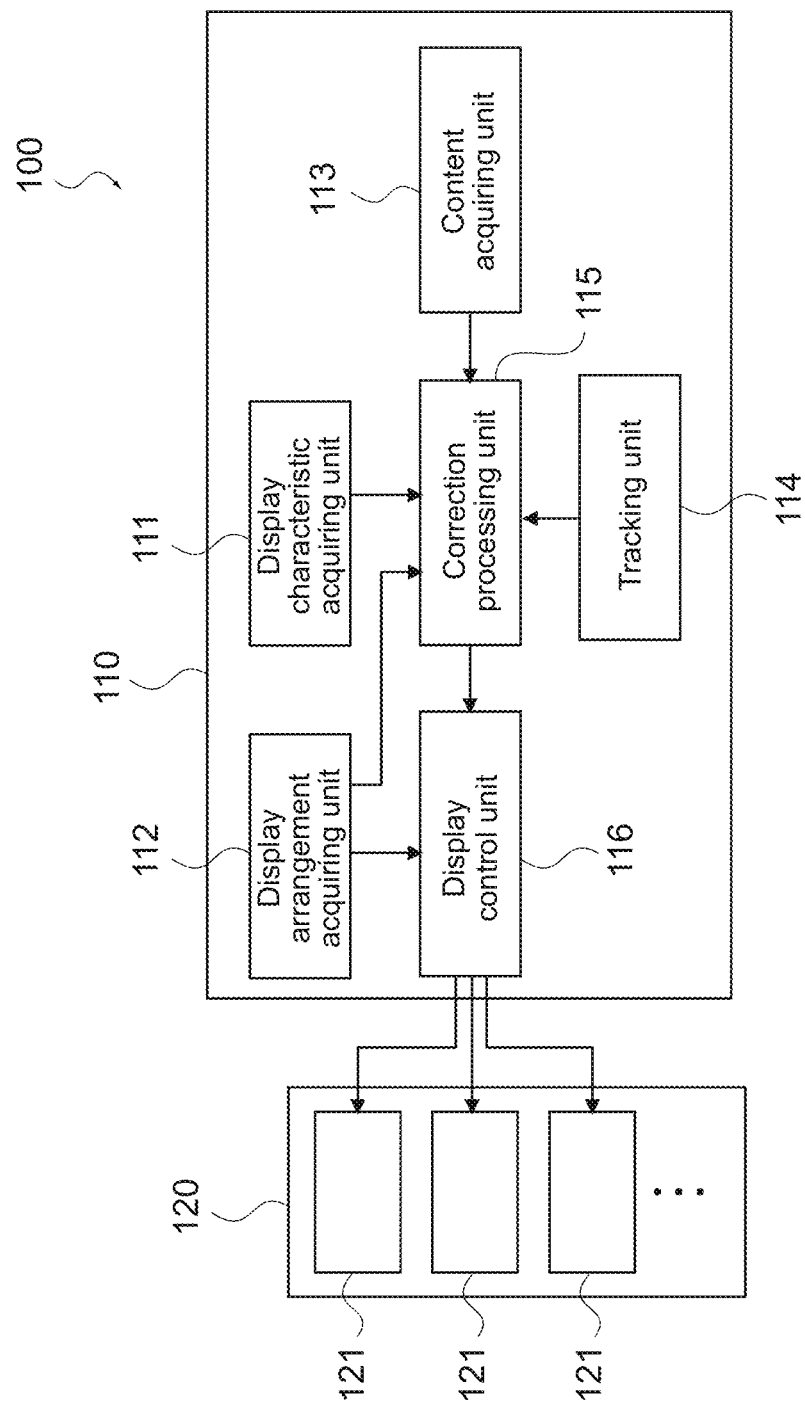
FIG. 1 is a block diagram showing a configuration of a control system according to an embodiment of the present technology.

FIG. 1 is a block diagram showing a configuration of a control system 100 according to this embodiment. As shown in the figure, the control system 100 includes a control device 110 and a tiling display 120.

The control device 110 is a control device that controls the tiling display 120. The tiling display 120 includes a plurality of displays 121 each connected to the control device 110.

Figure 2:
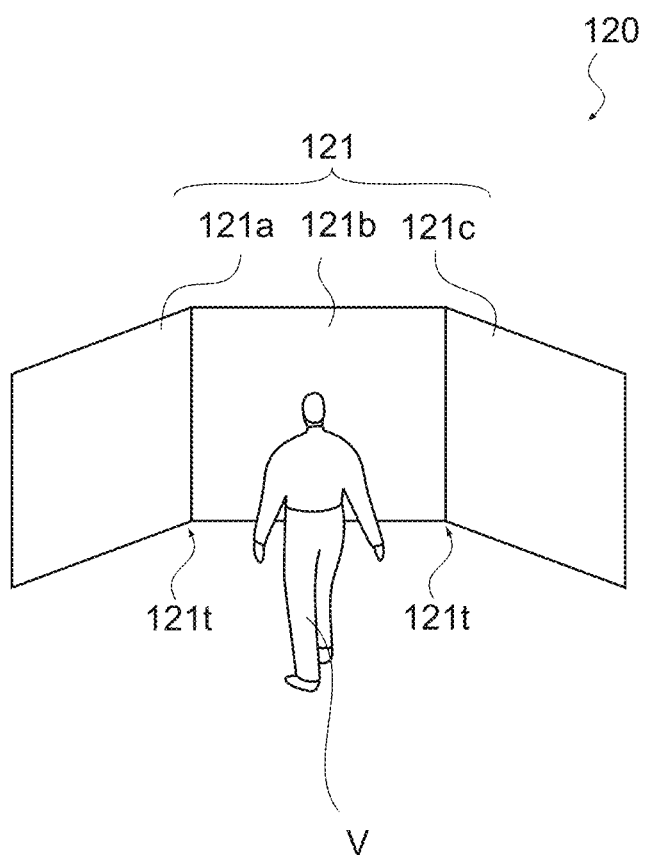
FIG. 2 is a schematic diagram of a tiling display of the control system.

FIG. 2 is a schematic diagram showing a configuration of the tiling display 120. As shown in the figure, the tiling display 120 is configured by tiling (spreading) the plurality of displays 121, and displays a video to a user V. Hereinafter, the displays 121 constituting the tiling display 120 will be referred to as a display 121a, a display 121b, and a display 121c, as the case may be.

Figure 3:
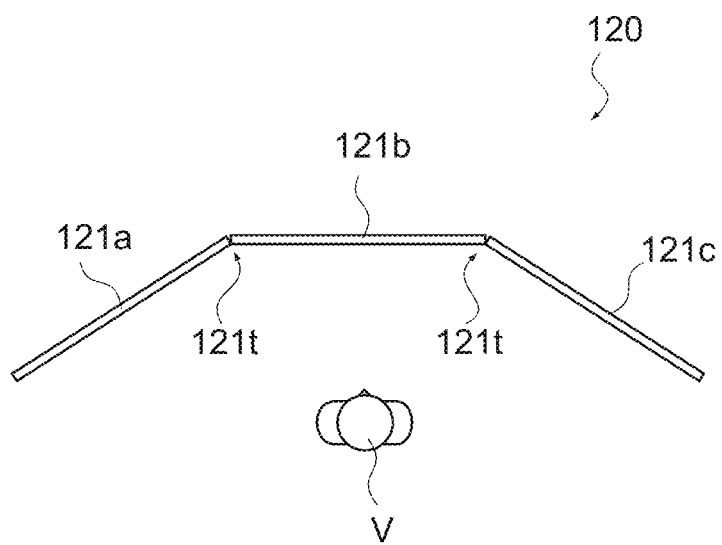
FIG. 3 is a schematic diagram of the tiling display.

The displays 121 are tiled so as to be non-parallel to each other between the adjacent displays 121. FIG. 3 is a schematic diagram of the tiling display 120 viewed from vertically above the user V. As shown in the figure, the display 121a and the display 121c are tiled so as to be inclined from the display 121b toward the user V side.

Hereinafter, as shown in FIG. 2 and FIG. 3, a boundary 121t is defined as a boundary at which the angle of the display differs between the adjacent displays 121 among the boundaries of the displays 121.

The display 121 generates and displays a video from the video signal supplied from the control device 110. The display 121 can be a self-luminous display using micro light emitting diodes (LEDs) as pixels.

Figure 4:
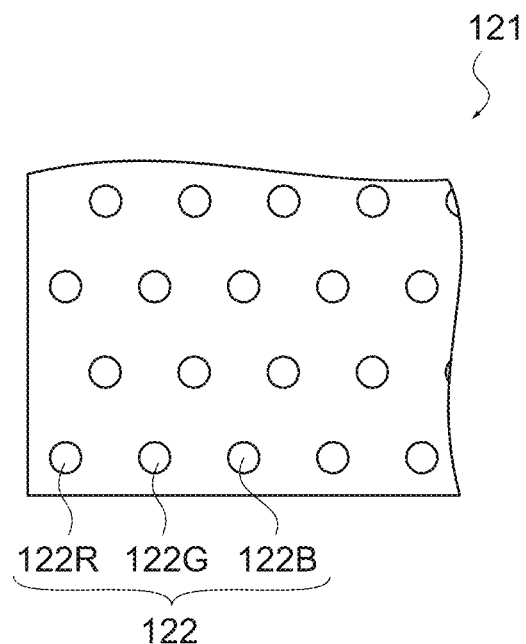
FIG. 4 is a schematic diagram showing the pixels of the display constituting the tiling display.

FIG. 4 is a partially enlarged view of the display 121 and is a schematic diagram showing pixels 122 constituted by the micro LEDs. The pixels 122 include red pixels 122R, green pixels 122G, and blue pixels 122B. Those pixels 122 are arranged to constitute the display 121. The display using the micro LEDs as pixels can have a display area to the display edge portion, and it is suitable for tiling.

Each display 121 is connected to the control device 110 by wired communication or wireless communication. In the wireless communication, use of 5G (fifth-generation mobile communication system) allows video transmission without compression, thus eliminating the need for computation associated with video compression and also allowing suppression of transmission delay.

As shown in FIG. 1, the control device 110 includes a display characteristic acquiring unit 111, a display arrangement acquiring unit 112, a content acquiring unit 113, a tracking unit 114, a correction processing unit 115, and a display control unit 116. Those units are functional configurations implemented by the cooperation of software and hardware.

Figure 5:
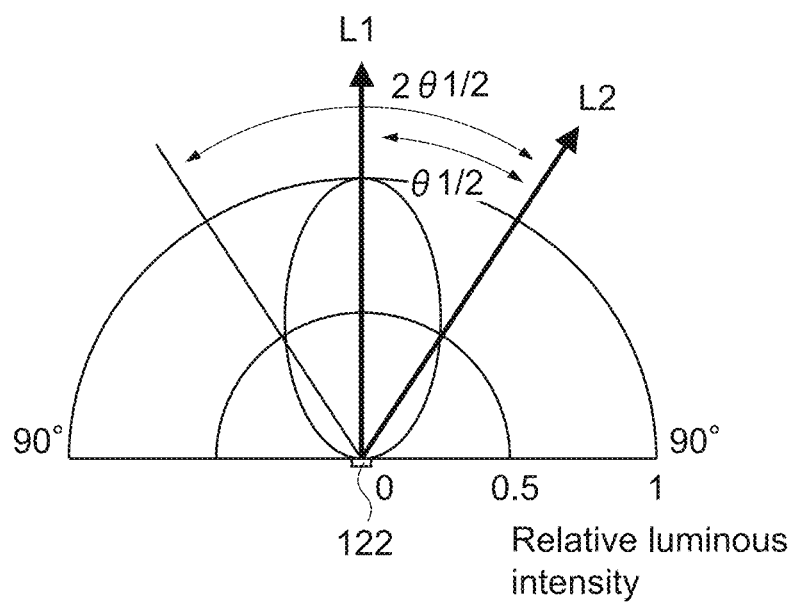
FIG. 5 is a schematic diagram showing the light-emitting characteristic of the display.

The display characteristic acquiring unit 111 acquires the light-emitting characteristics of the displays 121. FIG. 5 is a schematic diagram showing the relative luminous intensity of one pixel 122. Since the LED has a high directivity of outgoing light, the outgoing light from the pixel 122 changes the amount of light according to the outgoing direction. For example, the amount of light of outgoing light L2 in the oblique direction is smaller than the amount of light of outgoing light L1 in the front direction shown in FIG. 5. The amount of light gradually decreases as the angle becomes larger.

The display characteristic acquiring unit 111 is capable of acquiring such light-emitting characteristics by measurement. In this case, the display characteristic acquiring unit 111 is capable of obtaining a luminance value measured in front for a specific pixel 122, and while measuring it with an angle therefrom, obtaining the characteristics of attenuation (light-emitting characteristics) with the angle. Further, the display characteristic acquiring unit 111 may acquire the light-emitting characteristics from the data sheet indicating the characteristics of the pixel 122. The display characteristic acquiring unit 111 supplies the acquired light-emitting characteristics to the correction processing unit 115.

Figure 6:
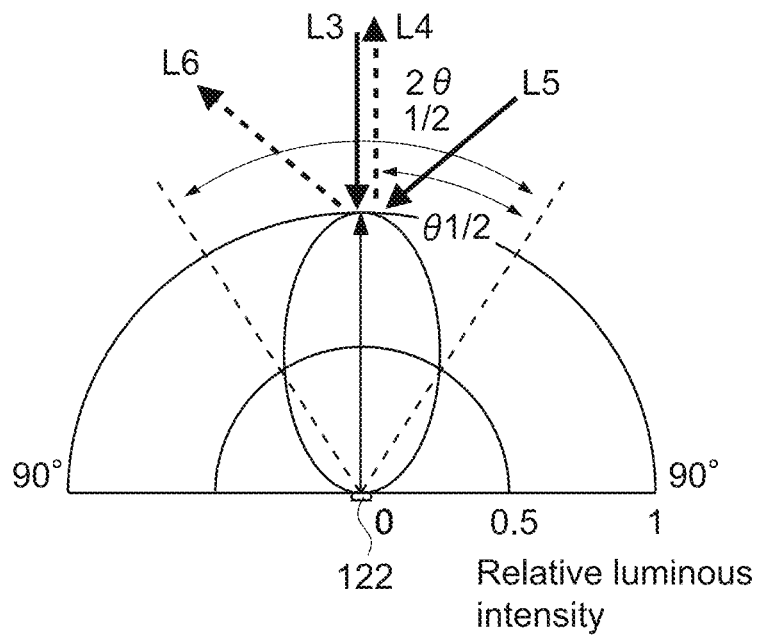
FIG. 6 is a schematic diagram showing the reflection characteristic of the display.

Further, the display characteristic acquiring unit 111 acquires the reflection characteristics of the displays 121 in addition to the light-emitting characteristics. FIG. 6 is a schematic diagram showing the relative luminous intensity of incident light. FIG. 6 shows reflected light L4 of incident light L3 incident on the pixel 122 in the front direction, and reflected light L6 of incident light L5 incident on the pixel 122 in the oblique direction.

The display characteristic acquiring unit 111 is capable of discretely measuring the reflectance at the incident angle of the light in accordance with the incident angle and obtaining the characteristics of the attenuation of light corresponding to the incident angle (reflection characteristics). Further, the display characteristic acquiring unit 111 may acquire the reflection characteristics from the data sheet indicating the characteristics of the pixel 122. The display characteristic acquiring unit 111 supplies the acquired reflection characteristics to the correction processing unit 115.

The display arrangement acquiring unit 112 acquires the arrangement of the displays 121. The display arrangement acquiring unit 112 is capable of acquiring the arrangement of the displays 121 by measurement. Specifically, the display arrangement acquiring unit 112 is capable of measuring the arrangement of the displays 121 by a structured-light method.

In this method, a predetermined pattern is projected onto the tiling display 120 by a projector, the deformation of the pattern according to the shape of the tiling display 120 is imaged by a camera, so that three-dimensional measurement of the tiling display 120 can be performed. The display arrangement acquiring unit 112 is capable of acquiring the arrangement of the displays 121 from the result of the three-dimensional measurement and a correspondence relationship of the displays 121.

Further, the display arrangement acquiring unit 112 may acquire the arrangement of the displays 121 set in advance, instead of the measurement. The display arrangement acquiring unit 112 supplies the acquired arrangement of the displays 121 to the correction processing unit 115 and the display control unit 116. When the display control unit 116 is supplied with the arrangement of the displays 121 from the display arrangement acquiring unit 112, the display control unit 116 is capable of understanding where the display 121 that outputs a signal is located in the tiling display 120.

The content acquiring unit 113 acquires the VR content presented to the user by the tiling display 120. The content acquiring unit 113 may receive the VR content via a network or may acquire the VR content by reading the VR content stored in the control device 110 or a recording medium. The content acquiring unit 113 supplies the acquired VR content to the correction processing unit 115.

Figure 7:
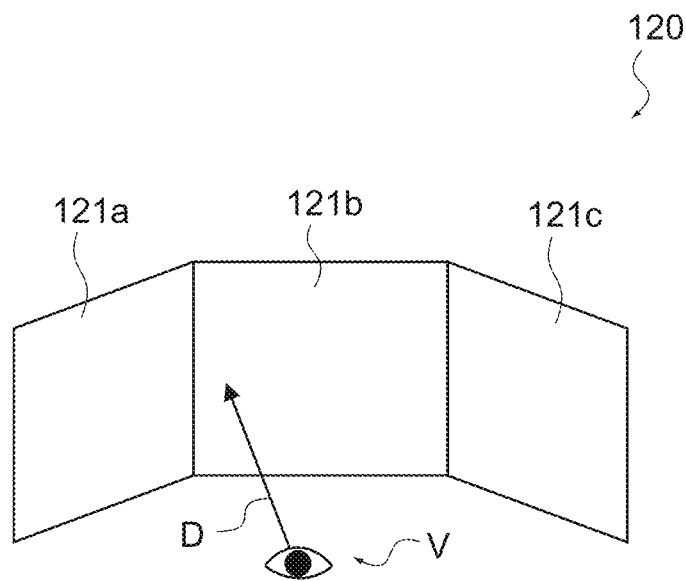
FIG. 7 is a schematic diagram showing tracking in a line-of-sight direction by a tracking unit of a control device of the control system.

The tracking unit 114 tracks the position and the line-of-sight direction of the user V. FIG. 7 is a schematic diagram showing tracking by the tracking unit 114. The tracking unit 114 tracks a position and a line-of-sight direction D of the user V as shown in the figure. The tracking unit 114 is capable of tracking the user V, the position, and the line-of-sight direction D by image recognition processing or the like. The tracking unit 114 supplies the tracking result to the correction processing unit 115.

Figure 8:
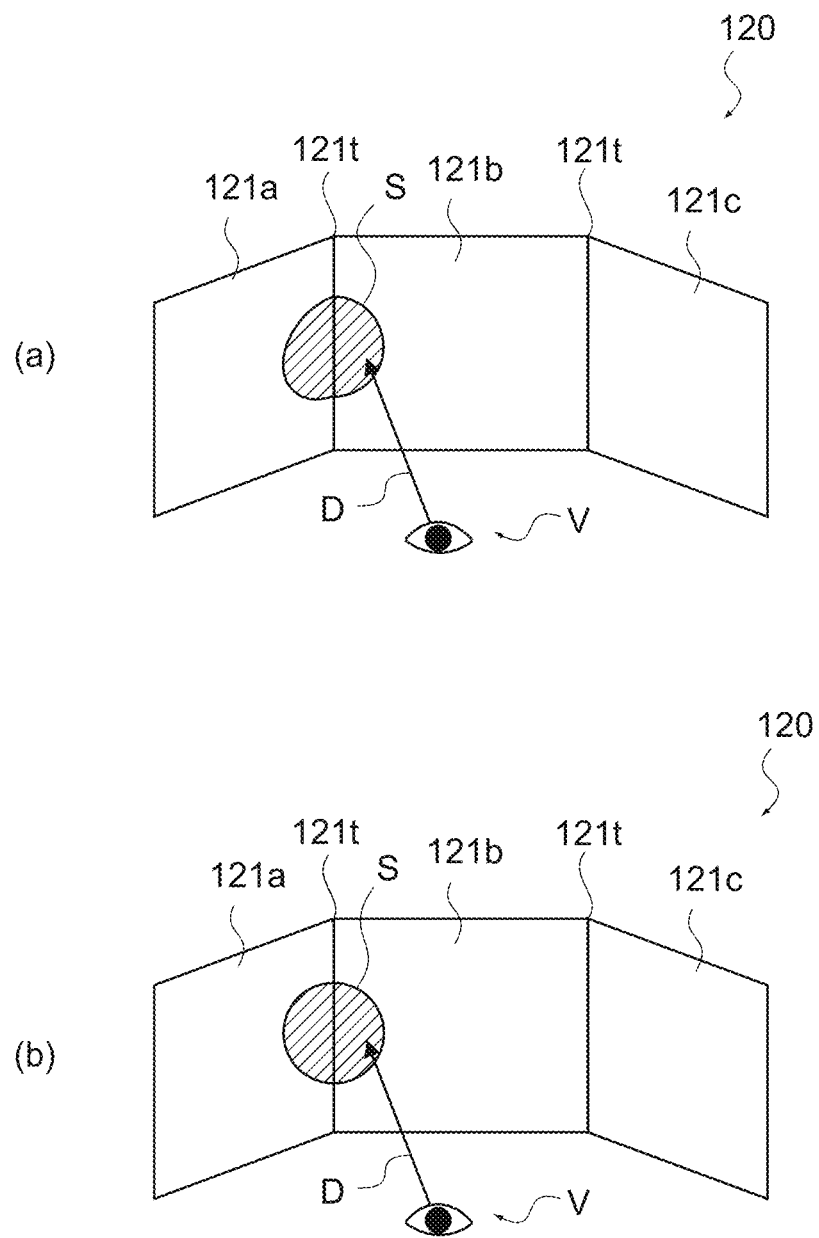
FIG. 8 is a schematic diagram showing geometric correction by a correction processing unit of the control device.

The correction processing unit 115 performs geometric correction on the video displayed on the tiling display 120. FIG. 8 is a schematic diagram showing the geometric correction by the correction processing unit 115. It is assumed that an object S included in the VR content is displayed on the tiling display 120 as shown in (a) of FIG. 8.

In the case where the object S is displayed through the boundary 121t, the display 121a and the display 121b are non-parallel to each other, and thus the shape of the object S becomes geometrically unnatural with the boundary 121t interposed therebetween if the display 121a and the display 121b remain as they are with the boundary 121t interposed therebetween.

The correction processing unit 115 performs geometric correction on the details displayed on the display 121 on the basis of the position and the line-of-sight direction D of the user V, which are supplied from the tracking unit 114, and the arrangement of the displays 121 supplied from the display arrangement acquiring unit 112. As shown in (b) of FIG. 8, the correction processing unit 115 is capable of correcting the geometric structure so as to be correct when viewed from the user V.

Furthermore, the correction processing unit 115 performs optical correction on the video displayed on the tiling display 120 and adjusts the brightness of each display 121 viewed from the user V so as to be continuous through the boundary 121t.

Figure 9:
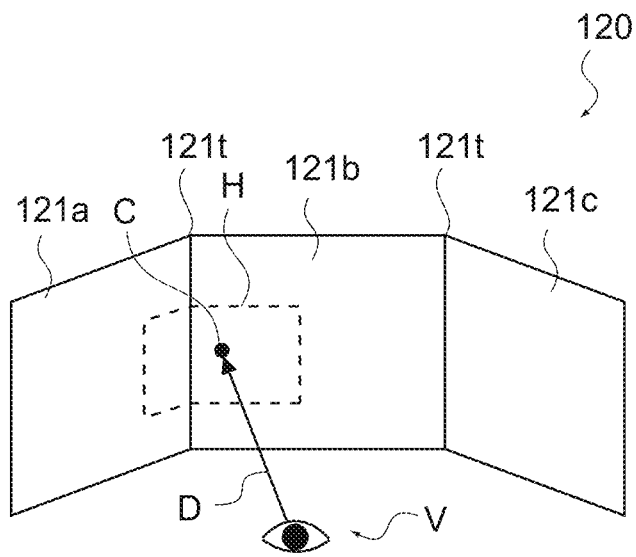
FIG. 9 is a schematic diagram of a visual field range specified by the correction processing unit.
Figure 10:
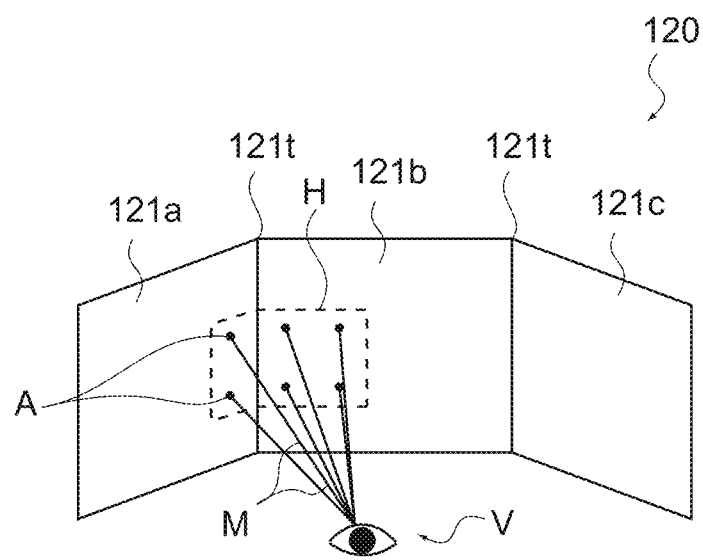
FIG. 10 is a schematic diagram showing ray tracing by the correction processing unit.

FIGS. 9 and 10 are schematic diagrams showing the optical correction by the correction processing unit 115. As shown in FIG. 9, the correction processing unit 115 specifies a gaze point C that is a point, at which the line-of-sight direction D arrives, in the display 121 and sets a visual field range H around the gaze point C.

The visual field range H is a range estimated to fall within the field of view of the user V and can have, for example, a rectangular shape centering around the gaze point C. The size of the visual field range H may be changed in accordance with the distance between the display 121 and the user V. Further, the visual field range H may be a range with a predetermined angle, for example, a range of 90° in the horizontal direction and 90° in the vertical direction, from the eye of the user V with the line-of-sight direction D as the center.

The correction processing unit 115 determines whether or not the boundary 121t of the displays 121 is included in the visual field range H. The correction processing unit 115 is capable of determining whether or not the boundary 121t is included in the visual field range H from the arrangement of the displays 121 and the position and the line-of-sight direction D of the user V.

If the boundary 121t is included in the visual field range H, the correction processing unit 115 performs the following optical correction. First, the correction processing unit 115 performs ray tracing for each position within the visual field range H. FIG. 10 shows a ray M incident on the eye of the user V from each position A within the visual field range H. The correction processing unit 115 estimates the amount of light of each ray M. The correction processing unit 115 is capable of estimating the amount of light on the basis of the arrangement of the displays 121, the light-emitting characteristics (see FIG. 5), and the position and the line-of-sight direction D of the user V.

Specifically, the correction processing unit 115 is capable of estimating the amount of light of the ray M incident on the eye of the user V from each pixel 122, using the position where each of the pixels 122 constituting the display 121 (see FIG. 4) is present as the position A.

For example, the amount of light L of the ray M incident on the eye of the user V from a certain pixel 122 is represented by the following (Equation 1).

$$L = tP \qquad \text{(Equation 1)}$$

In (Equation 1), P is the amount of light when a certain pixel 122 is viewed from the front (in a direction perpendicular to the display surface), and t is a ratio of attenuation according to the angle formed with the display surface. In such a manner, the amount of light of the ray M incident on the eye of the user V from a certain pixel 122 can be obtained by the light-emitting characteristic of the pixel 122 and the angle of the line-of-sight direction D with respect to the pixel 122.

Note that several points of the visual field range H are illustrated as the positions A in FIG. 10, but actually the amount of light of the ray M is estimated for a large number of positions within the visual field range H, for example, positions of about 4000 points in the horizontal direction by 2000 points in the vertical direction.

Figure 11:
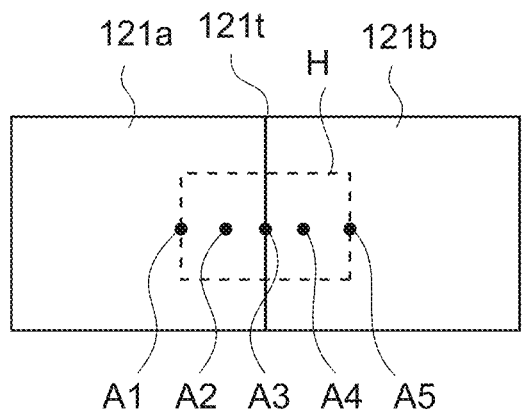
FIG. 11 is a schematic diagram showing each position within the visual field range.
Figure 12:
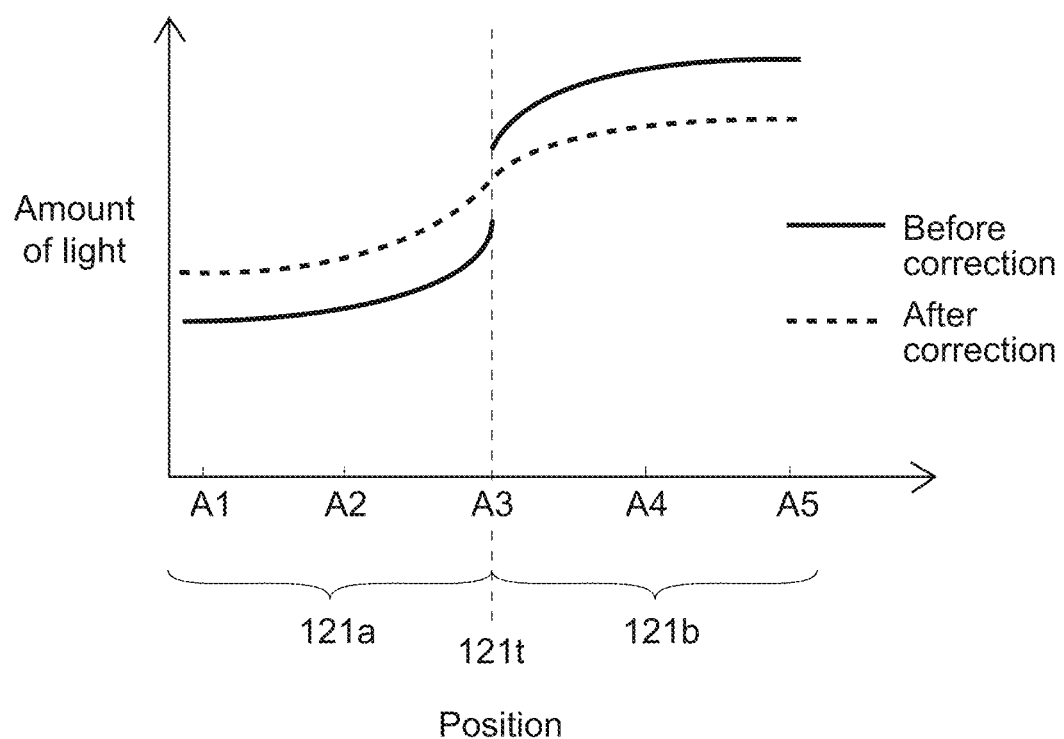
FIG. 12 is a schematic diagram showing optical correction by the correction processing unit.

The correction processing unit 115 adjusts the luminance values of the respective pixels 122 such that the amounts of light of the rays M become continuous. FIG. 11 is a schematic diagram showing positions A1 to A5 of the visual field range H, and FIG. 12 is a graph showing the amount of light of the ray M incident on the eye of the user V from each of the positions A1 to A5. Further, the following [Table 1] is a table showing an example of the amount of light of the ray M incident on the eye of the user V from each of the positions A1 to A5.

TABLE 1

| Position | A1 | A2 | A3 | A4 | A5 |
|---|---|---|---|---|---|
| Before correction | 180 cd/m² | 180 cd/m² | 180 cd/m² | 210 cd/m² | 210 cd/m² |
| After correction | 190 cd/m² | 195 cd/m² | 200 cd/m² | 205 cd/m² | 210 cd/m² |

In FIG. 12 and Table 1, the amount of light before optical correction is shown as "before correction", and the amount of light after optical correction is shown as "after correction". Before correction, the amount of light is discontinuous between the display 121a and the display 121b through the boundary 121t. This is because the angle of the display 121 at the boundary 121t is different.

Figure 13:
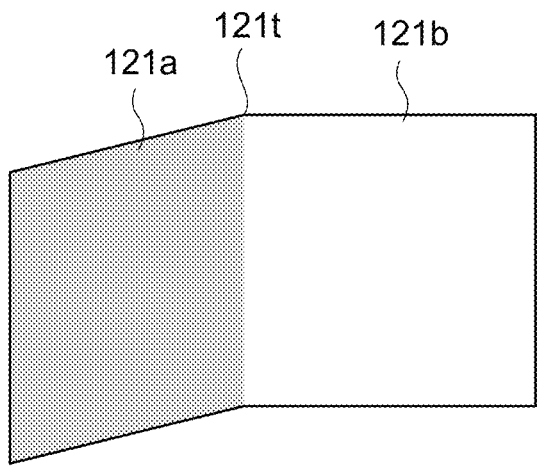
FIG. 13 is a schematic diagram showing displaying on the display in a state where the optical correction by the correction processing unit is not performed.

For that reason, the boundary 121t is visually recognized in the tiling display 120. FIG. 13 is a schematic diagram showing the brightness of the display 121a and the display 121b before correction. As shown in the figure, the boundary 121t is visually recognized due to the difference in brightness in the vicinity of the boundary 121t.

On the other hand, as shown in FIG. 12 and Table 1 as "after correction", the correction processing unit 115 adjusts the luminance values of the display 121a and the display 121b such that the brightness of the display 121a and the display 121b becomes continuous when viewed from the user V. Specifically, the correction processing unit 115 increases the luminance value of the darker display 121a and decreases the luminance value of the brighter display 121b.

Figure 14:
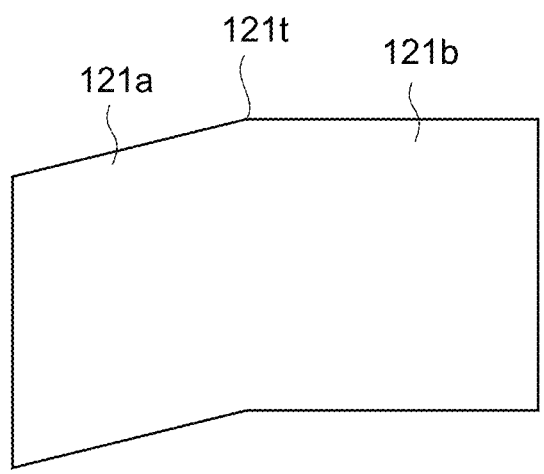
FIG. 14 is a schematic diagram showing displaying on the display in a state where the optical correction by the correction processing unit is performed.

FIG. 14 is a schematic diagram showing the brightness of the display 121a and the display 121b after correction. As shown in the figure, the brightness of the displays 121a and 121b becomes equal in the vicinity of the boundary 121t by the optical correction, and it is possible to prevent the boundary 121t from being visually recognized. Although the display 121a and the display 121b have been described above, the same applies to the display 121b and the display 121c.

Figure 15:
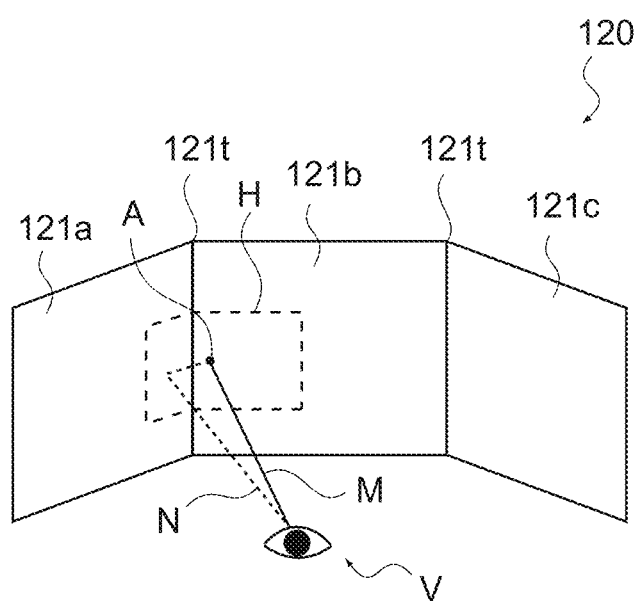
FIG. 15 is a schematic diagram showing ray tracing by the correction processing unit in consideration of display reflection.

Further, the correction processing unit 115 may perform optical correction in consideration of reflection by the display 121. FIG. 15 is a schematic diagram showing a ray M and a ray N incident on the eye of the user from one position A on the display 121b.

The ray M is a ray directly incident on the eye of the user V from the position A as described above. The ray N indicates a ray N emitted from the position A, reflected by the display 121a, and then incident on the eye of user V.

The correction processing unit 115 is capable of estimating the amount of light of the ray M by the method described above. Further, the correction processing unit 115 is capable of estimating the amount of light of the ray N on the basis of the arrangement of the displays 121, the reflection characteristics (see FIG. 6), and the position and the line-of-sight direction D of the user V.

The correction processing unit 115 estimates the sum of the amount of light of the ray M and the amount of light of the ray N as the amount of light incident on the eye of the user from the position A. The correction processing unit 115 calculates the sum of the amount of light of the ray M and the amount of light of the ray N for other positions A similarly, and estimates the sum as the amount of light incident on the eye of the user from each position A.

The correction processing unit 115 performs the above correction processing, that is, the processing of adjusting the luminance values of the display 121a and the display 121b such that the brightness of the display 121a and the display 121b becomes continuous (see FIG. 12), on the sum of the amount of light of the ray M and the amount of light of the ray N.

As a result, the reflection of light between the displays 121 is added, and the visibility of the boundary 121t can be reduced more reliably. Note that in the above description the reflection by the display 121a with respect to the display 121b has been described, but the correction processing unit 115 may add the amount of light similarly for the reflection by the display 121c.

The correction processing unit 115 may add the amount of light of reflection simultaneously for both the display 121a and the display 121c, or may add the amount of light of reflection for only the display closer to the gaze point C. Further, the correction processing unit 115 may add the amount of light of reflection, for example, only when the displays 121 have a positional relationship that is likely to mutually cause reflection on the basis of the arrangement of the displays 121.

The correction processing unit 115 executes the geometric correction and the optical correction as described above. When at least one of the position or the line-of-sight direction D of the user V moves, the correction processing unit 115 repeatedly executes the geometric correction and the optical correction in accordance with the tracking result. Note that the correction processing unit 115 may execute only the optical correction in accordance with the details of the VR content, for example, when the object S is not included. The correction processing unit 115 supplies the correction processing result to the display control unit 116.

The display control unit 116 outputs the video signal included in the VR content to each display 121 in accordance with the arrangement of the displays 121 supplied from the display arrangement acquiring unit 112 and generates a VR space by the tiling display 120.

At this time, the display control unit 116 reflects, in the video, the correction processing result supplied by the correction processing unit 115, that is, the deformation of the video by the geometric correction or the adjustment of the luminance values by the optical correction. This eliminates the influence due to the non-parallel displays 121, and makes it possible to present a VR experience with a high sense of immersion.

[Operation of Control System]

Figure 16:
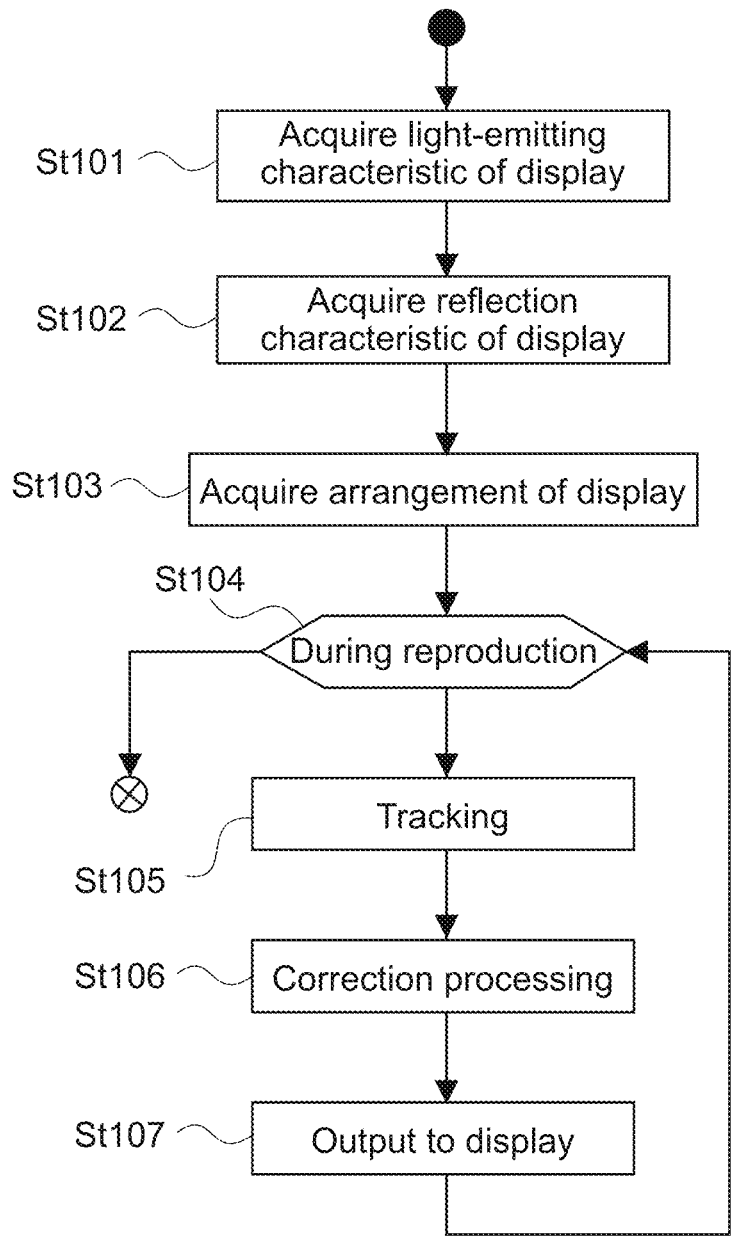
FIG. 16 is a flowchart showing the operation of the control device.

The operation of the control system 100 will now be described. FIG. 16 is a flowchart showing the operation of the control system 100. As shown in the figure, the display characteristic acquiring unit 111 acquires the light-emitting characteristics of the displays 121 (St101). The display characteristic acquiring unit 111 may acquire the light-emitting characteristics of the displays 121 from the measurement or data sheet.

Subsequently, the display characteristic acquiring unit 111 acquires the reflection characteristics of the displays 121 (St102). The display characteristic acquiring unit 111 is capable of acquiring the reflection characteristics of the displays 121 from the measurement or data sheet. The display characteristic acquiring unit 111 acquires those characteristics before the reproduction of the VR content and supplies them to the correction processing unit 115.

Subsequently, the display arrangement acquiring unit 112 acquires the arrangement of the displays 121 (St103). The display arrangement acquiring unit 112 acquires the arrangement of the displays 121 by measurement using a structured-light method or the like or by setting in advance, and understands the correspondence relationship of the displays 121 in the tiling display 120. The display arrangement acquiring unit 112 executes this processing before the reproduction of the VR content, and supplies the correspondence relationship of the displays 121 to the correction processing unit 115 and the display control unit 116.

Subsequently, the content acquiring unit 113 acquires the VR content and supplies the VR content to the correction processing unit 115. During the reproduction of the VR contents (St104), the tracking unit 114 tracks the position and the line-of-sight direction of the user V (St105). The tracking unit 114 notifies the correction processing unit 115 of the tracking result at any time.

The correction processing unit 115 performs correction processing on the video included in the VR content on the basis of the light-emitting characteristics and the reflection characteristics of the displays 121 acquired from the display characteristic acquiring unit 111 and the tracking result supplied from the tracking unit 114. The correction processing unit 115 performs geometric correction on the basis of the line-of-sight direction D of the user V as described above. Furthermore, the correction processing unit 115 performs ray tracing on the basis of the line-of-sight direction D, and performs optical correction using the tracking result, the light-emitting characteristics, and the reflection characteristics.

When the user V moves around the VR environment formed by the tiling display 120, the correction processing unit 115 newly executes geometric correction and optical correction in accordance with the position and the line-of-sight direction D of the user V. The correction processing unit 115 supplies the correction processing result to the display control unit 116.

The display control unit 116 generates a video signal to be output to each display 121 on the basis of the arrangement of the displays 121 and the correction processing result, and outputs the video signal to each display 121 (St107). The tracking unit 114 and the correction processing unit 115 continue the tracking and the correction processing until the reproduction of the VR content is completed.

The control system 100 performs the operation as described above. The geometric correction is performed by the correction processing unit 115, and thus it is possible to eliminate the deformation of the video due to the arrangement angle of the displays 121. Furthermore, the optical correction is performed by the correction processing unit 115, and thus it is possible to prevent the boundary, at which the angle of the display 121 changes, from being visually recognized. This allows the control system 100 to provide a VR experience with a high sense of immersion to the user V viewing the tiling display 120.

[Other Configurations of Tiling Display]

Figure 17:
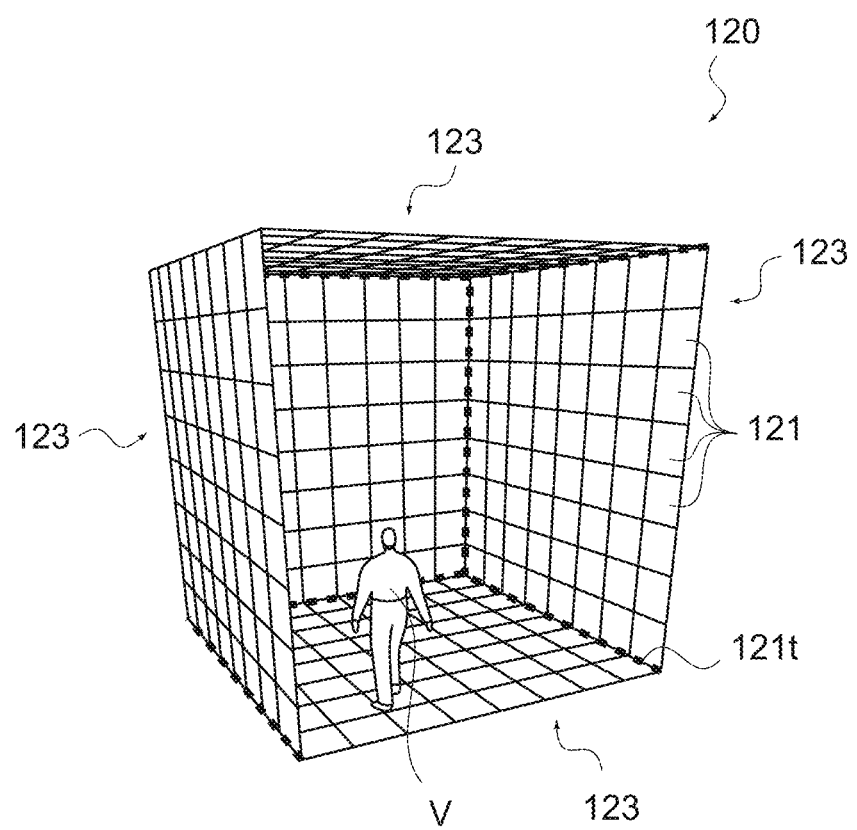
FIG. 17 is a schematic diagram of a tiling display having another configuration in the control system.

The tiling display 120 is not limited to the one described above. FIG. 17 is a schematic diagram of a tiling display 120 having another configuration. As shown in the figure, the tiling display 120 may have display surfaces 123 each including a plurality of displays 121 tiled in a planar shape.

The display surfaces 123 are disposed so as to form, for example, five surfaces of a rectangular parallelepiped (including a cube) and form a space surrounding the user V. In FIG. 17, a boundary 121t at which the angles of the displays 121 differ between the adjacent displays 121 is indicated by a broken line. When the boundary 121t is visually recognized by the user V, the sense of immersion of the VR experience is reduced. In this embodiment, however, it is possible to prevent the boundary 121t from being visually recognized as described above.

Note that the individual display 121 is not limited to a self-luminous display using the micro LEDs as pixels, and it may be a display having another structure, such as a liquid crystal display.

[Hardware Configuration]

Figure 18:
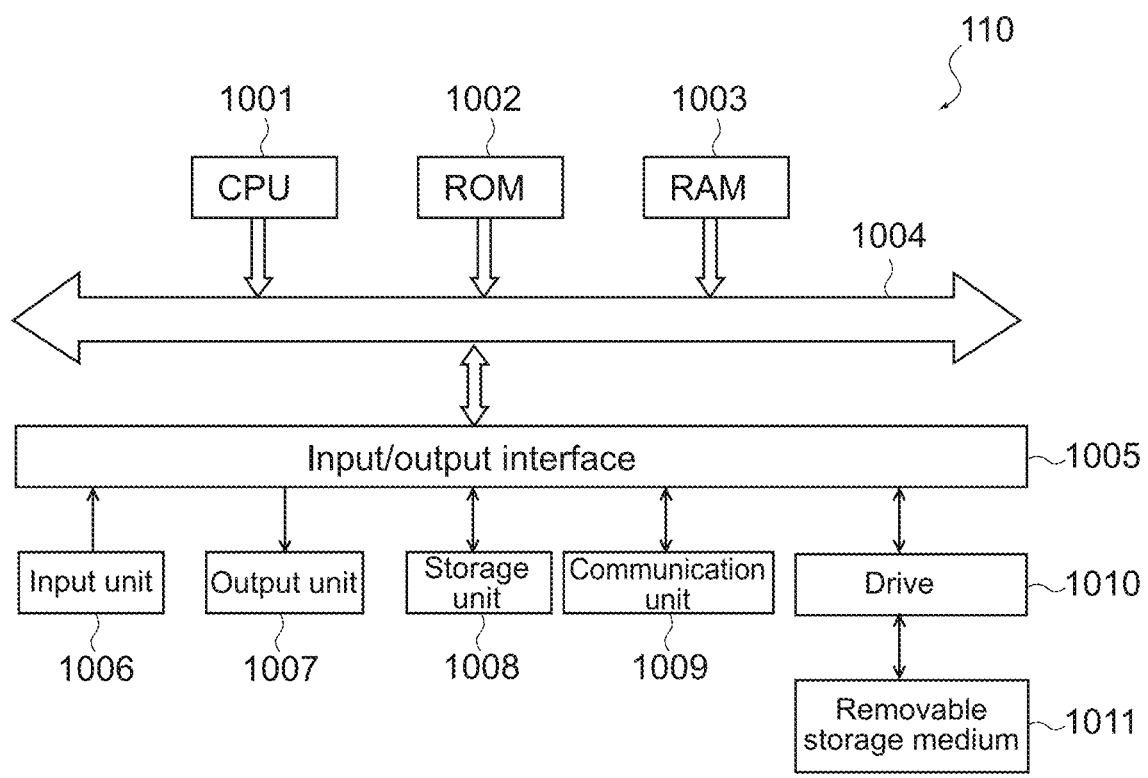
FIG. 18 is a block diagram showing a hardware configuration of the control device.

The hardware configuration of the control device 110 will be described. FIG. 18 is a schematic diagram showing a hardware configuration of the control device 110.

As shown in the figure, the control device 110 includes a central processing unit (CPU) 1001. An input/output interface 1005 is connected to the CPU 1001 via a bus 1004. A read only memory (ROM) 1002 and a random access memory (RAM) 1003 are connected to the bus 1004.

An input unit 1006 including an input device such as a keyboard or a mouse for a user to input an operation command, an output unit 1007 for outputting a processing operation screen or a processing result image to a display device, a storage unit 1008 including a hard disk drive and the like for storing programs and various types of data, and a communication unit 1009 including a local area network (LAN) adapter and the like for executing communication processing through a network represented by the Internet are connected to the input/output interface 1005. Further, a drive 1010 that reads and writes data from/to a removable storage medium 1011 such as a magnetic disk, an optical disc, a magneto-optical disk, or a semiconductor memory is connected to the input/output interface 1005.

The CPU 1001 executes various types of processing according to a program stored in the ROM 1002, or a program read from the removable storage medium 1011 such as a magnetic disk, an optical disc, a magneto-optical disk, or a semiconductor memory, installed in the storage unit 1008, and loaded to the RAM 1003 from the storage unit 1008. Data necessary for the CPU 1001 to perform various types of processing, and the like are also stored in the RAM 1003 as necessary.

In the control device 110 configured as described above, for example, the CPU 1001 loads the program stored in the storage unit 1008 to the RAM 1003 via the input/output interface 1005 and the bus 1004 and executes the program, thus performing the above-mentioned series of processing.

The program executed by the control device 110 can be provided, for example, by being recorded on the removable storage medium 1011 as a package medium or the like. Further, the program can be provided via a wired or wireless transmission medium such as a local area network, the Internet, or digital satellite broadcasting.

In the control device 110, the program can be installed in the storage unit 1008 via the input/output interface 1005 by mounting the removable storage medium 1011 to the drive 1010. Further, the program can be received by the communication unit 1009 via a wired or wireless transmission medium and installed in the storage unit 1008. Moreover, the program can be installed in advance in the ROM 1002 or the storage unit 1008.

Note that the program executed by the control device 110 may be a program in which processes are chronologically performed in the order of the description in the present disclosure, or may be a program in which processes are performed in parallel or a process is performed at a necessary timing such as a timing of calling.

In addition, the hardware configuration of the control device 110 may not include all in one device, and the control device 110 may be configured by a plurality of devices. Further, the hardware configuration of the control device 110 may be mounted partially or on a plurality of apparatuses connected to each other via a network.

Of the feature portions according to the present technology described above, at least two feature portions can be combined. In other words, the various feature portions described in each embodiment may be arbitrarily combined without distinguishing between the embodiments. Further, the various effects described above are not limitative but are merely illustrative, and other effects may be provided.

Note that the present technology may take the following configurations.

(1) A control device, which
acquires arrangement of displays in a tiling display in which a plurality of displays is tiled,
acquires a light-emitting characteristic of each of the displays,
tracks a position and a line-of-sight direction of a user with respect to the tiling display, and
adjusts a luminance value of each of the displays on the basis of the light-emitting characteristic and a tracking result by the tracking such that brightness of the displays viewed from the user becomes continuous through a boundary of the displays.

(2) The control device according to (1), in which
in the step of adjusting the luminance value, a visual field range visually recognized by the user in the tiling display is specified on the basis of the line-of-sight direction, an amount of light incident on an eye of the user from each position in the visual field range is estimated, and the luminance value of each of the displays is adjusted such that the amount of light incident on the eye of the user from each position becomes continuous.

(3) The control device according to (2), in which
each of the displays is a light emitting diode (LED) display including LED elements as pixels, and
in the step of adjusting the luminance value, the amount of light incident on the eye of the user from each of the LED elements in the visual field range is estimated, and the LED elements are controlled such that the amount of light incident on the eye of the user from each of the LED elements becomes continuous.

(4) The control device according to (2) or (3), in which
the control device further acquires a reflection characteristic of each of the displays, and
in the step of adjusting the luminance value, the amount of light incident on the eye of the user from each position is a sum of an amount of light directly incident on the eye of the user from each position and an amount of light incident on each of the displays from each position, reflected by each of the displays, and incident on the eye of the user.

(5) The control device according to any one of (1) to (4), in which
the control device further performs geometric correction on a video displayed on the displays on the basis of the arrangement of the displays and the tracking result by the tracking.

(6) The control device according to any one of (1) to (5), in which
in the step of acquiring arrangement of displays, a predetermined pattern is projected on the tiling display, and the arrangement of the displays is measured on the basis of a deformation of the pattern.

(7) A control program, which
acquires arrangement of displays in a tiling display in which a plurality of displays is tiled,
acquires a light-emitting characteristic of each of the displays,
tracks a position and a line-of-sight direction of a user with respect to the tiling display, and
adjusts a luminance value of each of the displays on the basis of the light-emitting characteristic and a tracking result by the tracking such that brightness of the displays viewed from the user becomes continuous through a boundary of the displays.

(9) A control method, including:
acquiring arrangement of displays in a tiling display in which a plurality of displays is tiled;
acquiring a light-emitting characteristic of each of the displays;
tracking a position and a line-of-sight direction of a user with respect to the tiling display; and
adjusting a luminance value of each of the displays on the basis of the light-emitting characteristic and a tracking result by the tracking such that brightness of the displays viewed from the user becomes continuous through a boundary of the displays.

(10) A control system, including:
a tiling display in which a plurality of displays is tiled such that at least some of the displays are non-parallel to an adjacent display; and
a control device that
acquires arrangement of the displays in the tiling display,
acquires a light-emitting characteristic of each of the displays,
tracks a position and a line-of-sight direction of a user with respect to the tiling display, and
adjusts a luminance value of each of the displays on the basis of the light-emitting characteristic and a tracking result by the tracking such that brightness of the displays viewed from the user becomes continuous through a boundary of the displays.

REFERENCE SIGNS LIST

100 control system
110 control device
111 display characteristic acquiring unit
112 display arrangement acquiring unit 113 content acquiring unit
114 tracking unit
115 correction processing unit
116 display control unit
120 tiling display
121 display

The invention claimed is:

1. A tiling-display control device, comprising circuitry configured to:
   acquire tiling arrangement of a first display and a second display of a tiling display;
   acquire respective light-emitting characteristics of the first display and the second display;
   acquire respective reflection characteristics of the first display and the second display;
   acquire a tracking result of a viewpoint of a user and a line-of-sight direction of the user with respect to the tiling display;
   estimate, on a basis of the tiling arrangement, the light-emitting characteristics and the reflection characteristics, a sum of
      an amount of direct light directly incident on an eye of the user from the first display and the second display, and
      an amount of reflected light incident on the eye of the user, wherein the reflected light includes a first light of the first display reflected from the second display and a second light of the second display reflected from the first display; and
   adjust, on a basis of the sum of the amount of the direct light and the amount of the reflected light, respective luminance values of each of the first display and the second display such that brightness of a region of the tiling display including a boundary of the first display and the second display becomes continuous.

2. The tiling-display control device according to claim 1, wherein
   each of the first display and the second display is a light emitting diode (LED) display including LED elements as pixels, and
   the circuitry is further configured to adjust the luminance values of the first display and the second display by controlling the LED elements.

3. The tiling-display control device according to claim 1, wherein
   the circuitry is further configured to perform geometric correction on a video displayed on the first display and the second display on a basis of the tiling arrangement and the tracking result.

4. The tiling-display control device according to claim 1, wherein
   the circuitry is further configured to:
      control a projector to project a predetermined pattern is projected on the tiling display; and
      measure the tiling arrangement of the displays is measured on a basis of a deformation of the projected pattern.

5. A non-transitory computer-readable medium having embodied thereon a program, which when executed by a computer causes the computer to execute a control method, the method comprising:
   acquiring tiling arrangement of a first display and a second display of a tiling display;
   a acquiring respective light-emitting characteristics of the first display and the second display;
   acquiring respective reflection characteristics of the first display and the second display;
   acquiring a tracking result of a viewpoint of a user and a line-of-sight direction of the user with respect to the tiling display;
   estimating, on a basis of the tiling arrangement, the light-emitting characteristics and the reflection characteristics, a sum of
      an amount of direct light directly incident on an eye of the user from the first display and the second display, and
      an amount of reflected light incident on the eye of the user, wherein the reflected light includes a first light of the first display reflected from the second display and a second light of the second display reflected from the first display; and
   adjusting, on a basis of the sum of the amount of the direct light and the amount of the reflected light, respective luminance values of the first display and the second display such that brightness of a region of the tiling display including a boundary of the first display and the second display becomes continuous.

6. A control method, comprising:
   acquiring tiling arrangement of a first display and a second display of a tiling display;
   acquiring respective light-emitting characteristics of the first display and the second display;
   acquiring respective reflection characteristics of the first display and the second display;
   acquiring a tracking result of a viewpoint of a user and a line-of-sight direction of the user with respect to the tiling display;
   estimating, on a basis of the tiling arrangement, the light-emitting characteristics and the reflection characteristics, a sum of
      an amount of direct light directly incident on an eye of the user from the first display and the second display, and
      an amount of reflected light incident on the eye of the user, wherein the reflected light includes a first light of the first display reflected from the second display and a second light of the second display reflected from the first display; and
   adjusting, on a basis of the sum of the amount of the direct light and the amount of the reflected light, respective luminance values of the first display and the second display such that brightness of a region of the tiling display including a boundary of the first display and the second display becomes continuous.

7. A tiling-display control system, comprising:
   a tiling display including a first display and a second display that are inclined to each other; and
   a control device configured to
      acquire information representing tiling arrangement of the first display and the second display,
      a acquire information representing respective light-emitting characteristics of each of the first display and the second display,
      acquire respective reflection characteristics of the first display and the second display,
      acquire a tracking result of a viewpoint of a user and a line-of-sight direction of the user with respect to the tiling display,
      estimate, on a basis of the tiling arrangement, the light-emitting characteristics and the reflection characteristics, a sum of
         an amount of direct light directly incident on an eye of the user from the first display and the second display, and an amount of reflected light incident on the eye of the user, wherein the reflected light includes a first light of the first display reflected from the second display and a second light of the second display reflected from the first display, and adjusts a adjust, on a basis of the sum of the amount of the direct light and the amount of the reflected light, respective luminance values the first display and the second display such that brightness of a region of the tiling display including a boundary of the first display and the second display becomes continuous.

\* \* \* \* \*